United States Patent
Yokoyama et al.

[11] Patent Number: 5,413,974
[45] Date of Patent: May 9, 1995

[54] ALUMINUM-CONTAINING OXIDE AND PROCESS FOR PRODUCING ALUMINUM-CONTAINING OXIDE

[75] Inventors: Akinori Yokoyama, Kurashiki; Hitoshi Nakajima, Yokohama, both of Japan

[73] Assignee: Asashi Kasei Kogyo Kabushiki Kaisha, Osaka, Japan

[21] Appl. No.: 776,408

[22] PCT Filed: Mar. 27, 1990

[86] PCT No.: PCT/JP90/00399

§ 371 Date: Nov. 22, 1991

§ 102(e) Date: Nov. 22, 1991

[87] PCT Pub. No.: WO91/14654

PCT Pub. Date: Oct. 3, 1991

[51] Int. Cl.$^6$ .............. C04B 35/10; C04B 35/60; B01J 21/04; B01J 23/18

[52] U.S. Cl. .............. 501/153; 501/154; 501/127; 501/128; 502/354; 502/205; 502/202; 502/249; 502/324; 502/352; 502/242; 502/335; 502/336; 423/600; 423/593

[58] Field of Search .............. 502/354, 205, 202, 249, 502/324, 352, 242, 335, 336; 501/153, 154, 127, 128; 428/688; 423/600, 593

[56] References Cited

U.S. PATENT DOCUMENTS 4,344,926 8/1982 Petty et al. .............. 502/354 X

FOREIGN PATENT DOCUMENTS 0256424 5/1988 German Dem. Rep. .

58-49623 3/1983 Japan .

OTHER PUBLICATIONS

Chemical Abstracts, CA 110(14):126938v (1988) no month available.
Chemical Abstracts, CA 90(8):61943q (1978) no month available.
Chemical Abstracts, CA 88(22):162169f (1978) no month available.
Chemical Abstracts, CA 83(10):89325u (1975) no month available.

*Primary Examiner*—Paul Lieberman
*Assistant Examiner*—Douglas McGinty
*Attorney, Agent, or Firm*—Finnegan, Henderson, Farabow, Garrett & Dunner.

[57] ABSTRACT

A substantially amorphous, aluminum-containing oxide having the composition $Al_{1-x-y1-y2}Bi_xM_{1y1}O_z$ (wherein x is defined by $0.0001 \leq x \leq 0.10$, $M_1$ is at least one selected from Si, P, B, Sb, Se, Te, Sn, Zn, In, Cr, Nb, Sc, Y, Sr, Ba, Ca, Na, Li, Mg, Mn, W, Ti, Zr, Hf, Be and rare earth metals, $M_2$ is at least one selected from Fe, Ni, Co, Rh, Ru, Re, Cu and Pb, y1 is defined by $0 \leq y1 \leq 0.1$, y2 is defined by $0 \leq y2 \leq 0.01$, z is defined by $1.2 \leq z \leq 1.5$, and x, y1, y2 and z are each an atomic ratio); an aluminum-containing metal composition containing the above oxide and Al and/or Bi in a metallic state; a process for producing the above oxide or the above metal composition; and a molded article formed from the above oxide or the above metal composition. The above oxide or the above metal composition is useful as an electronic part, a catalyst, and the like.

2 Claims, 2 Drawing Sheets

5,413,974

ALUMINUM-CONTAINING OXIDE AND PROCESS FOR PRODUCING ALUMINUM-CONTAINING OXIDE

TECHNICAL FIELD

The present invention relates to an aluminum-containing oxide for use as a machine part, an electronic part such as an electronic circuit substrate or a cerdip package, a catalyst, a catalyst support, a sensor, an adsorbent, and a filler for chromatography, a molded article obtained by molding the aluminum-containing oxide, an article obtained by subjecting the molded article to heat treatment, and a process for producing the aluminum-containing oxide.

TECHNICAL BACKGROUND

A conventional molded article of an aluminum-containing oxide is obtained by adding an organic compound or an inorganic compound as a binder to an alumina powder and molding the resultant mixture. A machine part or an electronic part of aluminum-containing oxide is produced by further subjecting the molded article to a sintering treatment at a high temperature of 1,400° C. or higher (For example, see the Supplement to Kogyo Zairyo (Industrial Materials), November 1987, on a process for producing an alumina substrate as one example of molded articles of an aluminum-containing oxide, issued by Nikkan Kogyo Shinbunsha). As a conventional process for producing an aluminum oxide powder, there is available a method in which alumina produced by a Bayer method is milled, a method in which aluminum hydroxide obtained from an aluminum compound by a coprecipitation method is ignited and then milled, a CVD method (gaseous phase reaction deposition method) in which an alumina oxide powder is synthesized in a gaseous phase from a special aluminum compound having a volatility.

In a conventional method for producing a molded article from an aluminum oxide powder, an article obtained by adding an organic compound or an inorganic compound as a binder to an aluminum oxide powder and molding the resultant mixture is required to be treated at a high temperature of 1,400° C. or higher as described above. On the other hand, when an aluminum powder is molded without a binder, it is required to mold it at a high temperature of 1,100° C. or higher, or to employ a means such as a hot-press, etc.

In other conventional methods for producing aluminum oxides, such as the Bayer method, the method of igniting aluminum hydroxide, etc., it is burdensome to remove harmful impurities, and the finely milling step is complicated. Furthermore, aluminum oxides obtained by these methods are usually crystalline. A sputtering method of a CVD method is known to be a method for obtaining an amorphous aluminum oxide. However, the handling of a raw material or the production process according to that method is complicated and troublesome.

DISCLOSURE OF THE INVENTION

With regard to a process for producing a molded article from an aluminum oxide powder, the present inventors have made a diligent study for a process for producing a molded article at a low temperature. As a result, it has been found that a novel aluminum-containing oxide powder having a composition containing a trace amount of bismuth is effective for producing a molded article at a low temperature, and that the above novel powder can be easily produced by rapidly cooling a melt of an aluminum metal to which a trace amount of bismuth metal has been incorporated to coagulate the melt and then oxidizing the coagulation product. On the basis of this finding, the present invention has been completed. That is, it is an object of the present invention to provide a substantially amorphous, aluminum-containing oxide having a composition $Al_{1-x-y1-y2}Bi_xM_{1y1}M_{2y2}O_z$ (wherein x is defined by $0.0001 \leq x \leq 0.10$, $M_1$ is at least one selected from Si, P, B, Sb, Se, Te, Sn, Zn, In, Cr, Nb, Sc, Y, Sr, Ba, Ca, Na, Li, Mg, Mn, W, Ti, Zr, Hf, Be and rare earth metals, $M_2$ is at least one selected from Fe, Ni, Co, Rh, Ru, Re, Cu and Pb, y1 is defined by $0 \leq y1 \leq 0.1$, y2 is defined by $0 \leq y2 \leq 0.01$, z is defined by $1.2 \leq z \leq 1.5$, and x, y1, y2 and z are each an atomic ratio), a metal composition containing a trace amount of bismuth metal and/or aluminum metal, processes for producing these oxides and metal compositions, and molded articles obtained from these oxides and metal compositions or containing these oxides and metal compositions.

MOST PREFERRED EMBODIMENTS FOR WORKING THE INVENTION

Figure 1:
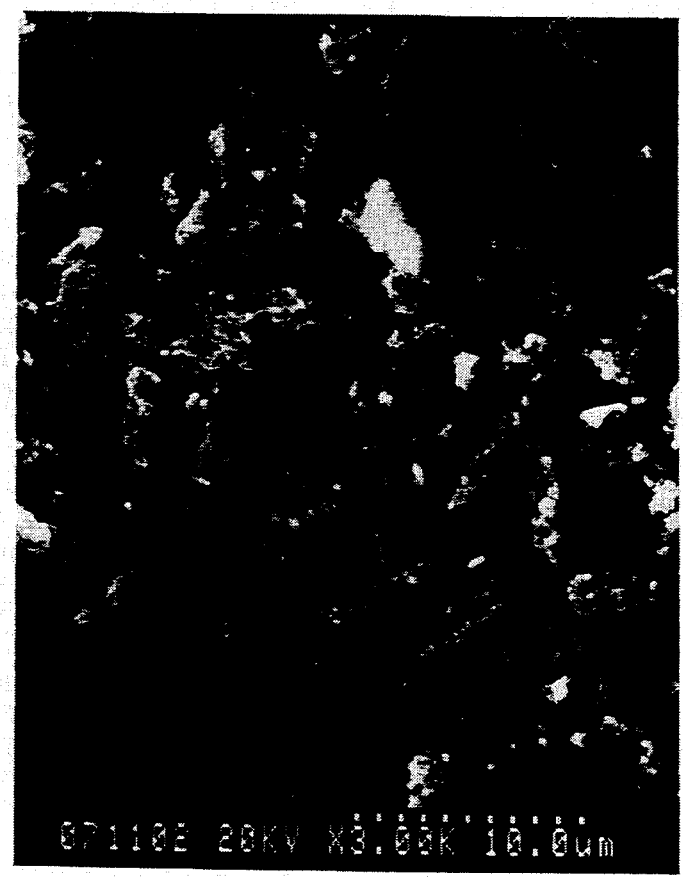
FIG. 1 is a scanning electron microscope photograph showing the measurement of the particle size of an oxide powder of the present invention obtained in Example 1.

The first embodiment of the present invention relates to a substantially amorphous, aluminum-containing oxide having the composition $Al_{1-x-y1-y2}Bi_xM_{2y2}O_z$ (wherein x is defined by $0.0001 \leq x \leq 0.10$, $M_1$ is at least one selected from Si, P, B, Sb, Se, Te, Sn, Zn, In, Cr, Nb, Sc, Y, Sr, Ba, Ca, Na, Li, Mg, Mn, W, Ti, Zr, Hf, Be and rare earth metals, $M_2$ is at least one selected from Fe, Ni, Co, Rh, Ru, Re, Cu and Pb, y1 is defined by $0 \leq y1 \leq 0.1$, y2 is defined by $0 \leq y2 \leq 0.01$, z is defined by $1.2 \leq z \leq 1.5$, and x, y1, y2 and z are each an atomic ratio).

The second embodiment relates to an aluminum-containing metal composition containing an amorphous metallic state.

The third embodiment relates to an aluminum-containing metal composition containing an amorphous oxide having the composition $Al_{1-x-y1-y2}Bi_xM_{1y1}M_{2y2}O_z$ (wherein x is defined by $0.0001 \leq x \leq 0.10$, $M_1$ is at least one selected from Si, P, B, Sb, Se, Te, Sn, Zn, In, Cr, Nb, Sc, Y, Sr, Ba, Ca, Na, Li, Mg, Mn, W, Ti, Zr, Hf, Be and rare earth metals, $M_2$ is at least one selected from Fe, Ni, Co, Rh, Ru, Cu and Pb, y1 is defined by $0 \leq y1 \leq 0.1$, y2 is defined by $0 \leq y2 \leq 0.01$, z is defined by $1.2 \leq z \leq 1.5$, and x, y1, y2 and z are each an atomic ratio) and Al or Bi in a metallic state.

The fourth embodiment relates to the above amorphous aluminum-containing oxide that is a powder having an average particle diameter of 0.1 to 100 microns.

The fifth embodiment relates to the above aluminum-containing metal composition that is a powder having an average particle diameter of 0.1 to 100 microns.

The sixth embodiment relates to a molded article formed by molding an amorphous aluminum-containing oxide or an aluminum-containing metal composition.

The seventh embodiment relates to a process for producing the aluminum-containing oxide or the aluminum-containing metal composition of any one of the first to fifth embodiments, which comprises rapidly cooling a melt having a composition $Al_{1-x-y1-y2}Bi_xM_{1y1}M_{2y2}$ (wherein x is defined by $0.0001 \leq x \leq 0.10$, $M_1$ is at least one selected from Si, P, B, Sb, Se, Te, Sn, Zn, In, Cr, Nb, Sc, Y, Sr, Ba, Ca, Na, Li, Mg, Mn, W, Ti, Zr, Hf, Be and rare earth metals, $M_2$ is at least one selected from Fe, Ni, Co, Rh, Ru, Re, Cu and Pb, y1 is defined by $0 \leq y1 \leq 0.1$, y2 is defined by $0 \leq y2 \leq 0.01$, and x, y1 and y2 are each an atomic ratio) to coagulate the melt, and then oxidizing the resultant coagulation product.

The eighth invention relates to a crystalline aluminum-containing oxide obtained by subjecting the above amorphous aluminum-containing oxide or the above aluminum-containing metal composition to a heat treatment.

The ninth embodiment relates to a molded article of a crystalline aluminum-containing oxide obtained by subjecting a molded article of an aluminum-containing oxide to a heat treatment.

When x in the above $Al_{1-x-y1-y2}Bi_xM_{2y2}$ composition (in which x, y1, y2, $M_1$ and $M_2$ are as defined above) is less than 0.0001, the molding at a low temperature is difficult. When x exceeds 0.10, the electrical insulation decreases. The range of x is preferably 0.001 inclusive to 0.005 inclusive, more preferably 0.002 inclusive to 0.02 inclusive. $M_1$ and $M_2$ may be absent, or may be incorporated as required. When, however, y1 exceeds 0.1 and y2 exceeds 0.01, the electrical insulation decreases.

Although differing depending upon the oxidation conditions, in view of low-temperature moldability, the value of z in the above composition is in the range of $1.2 \leq z < 1.5$, preferably $1.3 \leq z \leq 1.495$, more preferably $0.4 \leq z \leq 1.49$. However, the value of z is rigorously determined by correcting the amount of oxygen adsorbed on and taken into a sample when measured.

As a preferred process for producing the aluminum oxide powder of the present invention, a melt having the composition of $Al_{1-x-y1-y2}Bi_xM_{1y1}M_{2y2}$ (wherein $0.0001 \leq x \leq 0.10$, each of $M_1$ and $M_2$ is at least one selected from the above-described elements, $0 \leq y1 \leq 0.1$, $0 \leq y2 \leq 0.01$, atomic ratio) is rapidly cooled for coagulation, and then oxidized. Raw materials, aluminum, metallic bismuth, $M_1$ and $M_2$ may contain a small amount of impurities.

The rapid cooling rate is preferably not less than $10^3$ °C./second, more preferably not less than $10^4$ °C./second. As a rapid cooling and coagulation method, there is available a gas atomizing method, a high-pressure water atomizing method, a method in which a melt is rapidly cooled by allowing it to collide against a rotor, a rotational electrode method, a method which is a combination of the gas atomizing method with the method in which a melt is rapidly cooled by allowing it to collide against a rotor. The gas used in the gas atomizing method is preferably selected from gases which are not reactive with a melt used in the present invention, such as argon, helium and nitrogen gases, or gases having low reactivity. The gas may contain a small amount of oxygen and water.

The gas atomizing method is a rapid cooling and coagulation method in which a melt mixture of metal aluminum into which a trace amount of bismuth has been incorporated (and $M_1$ and $M_2$ have been incorporated as required) (to hereinafter be referred to as "present melt") is jetted through a nozzle and atomized with a high-velocity gas stream to form fine particles. The low-temperature and high-velocity gas can be obtained by a method in which a high-pressure gas is adiabatically expanded or a method in which a liquefied gas is jetted.

The high-pressure water atomizing method is a rapid cooling and coagulation method in which high-pressure water is allowed to collide against a melt jetted through a nozzle to atomize the melt.

In the method in which a melt is rapidly cooled by allowing it to collide against a rotor, the present melt flows out through a nozzle on a slit and is fed onto a rotor having a low-temperature surface to rapidly cool and coagulate it, whereby a ribbon-shaped thin piece is obtained. A preferred rotor used in this method is a rotor which has the form of a drum, roll, disk, etc., and which is made of a metal, etc., having good thermal conductivity. The rotation rate of the rotor in the position where the present melt collides against it is preferably 100 to 100,000 m/minute, more preferably 200 to 10,000 m/minute. The surface temperature of the rotor is preferably not more than 200° C., more preferably not more than 100° C. In the method which is a combination of the gas atomizing method with the method in which a melt is rapidly cooled by allowing it to collide against a rotor, the present melt is rapidly cooled by jetting it through a nozzle to atomize it with a high-velocity gas stream, and immediately allowing the resultant atomized droplets to collide against a rotor having a low-temperature surface.

The rapidly cooled and coagulated aluminum-containing alloy used in the present invention easily undergoes oxidation when brought into contact with an oxygen-containing gas. In general, a rigid oxide layer is formed on an aluminum surface due to oxidation. Therefore, no oxidation proceeds inside the aluminum. Surprisingly, however, the aluminum alloy containing a trace amount of bismuth used in the present invention undergoes oxidation even at a low temperature until aluminum inside the alloy is oxidized, and the alloy forms a substantially amorphous aluminum-containing oxide. The oxygen-containing gas for the oxidation is selected from air, oxygen or a gas mixture of oxygen with an inert gas of argon or nitrogen. Although the oxygen concentration of the oxygen-containing gas is not specially limited, air is preferred in view of its ease of handling. The temperature at which the aluminum alloy is brought into contact with the oxygen-containing gas may be ambient temperature. The oxidation may be accelerated by heating the alloy as required, or may be moderated by cooling it. When an oxygen-containing gas which also contains a small amount of water is used, the rate of forming a powder can be accelerated. According to the method of rapidly cooling the present melt to coagulate it, a coagulation product is obtained in the form of a ribbon, a milled fragment or a powder. The coagulation product in the form of a ribbon, a milled fragment, or the like is formed into a powder by only oxidizing it without mechanically milling it. The coagulation product may be further finely milled, or the time for forming a powder may be decreased by the use of a ball mill, etc., as required. When the value of x in the $Al_{1-x-y1-y2}Bi_xM_{1y1}M_{2y2}$ of the present invention is not less than 0.001, it is easily formed into a powder by oxidation. When the value of x is not less than 0.002, it becomes a powder having a large surface area and an average particle diameter of not more than 100 microns when it is only allowed to stand in air at room temperature.

The aluminum-containing oxide of the present invention preferably contains a small amount of bismuth and/or aluminum in a metallic state, and these metals can be incorporated if the conditions (temperature, time, etc.) are properly selected. The amounts of both aluminum and bismuth in a metallic state are preferably not more than 0.1 and not more than 0.02 in terms of atomic ratio, respectively, in view of electrical insulation.

The aluminum-containing oxide of the present invention is substantially amorphous, and it can be rendered crystalline by heat treatment at a high temperature. For example, when heated at 700° C. for 8 hours, it becomes a crystalline alumina. When this heat treatment is carried out in an inert gas, a crystalline alumina can be produced which contains a small amount of metallic bismuth and/or metallic aluminum.

In the measurement of the average particle diameter of the aluminum-containing oxide powder of the present invention, usually, 100 pieces of the powder particles are measured with a scanning electron microscope, and the average particle diameter is expressed as an average of the measurement values obtained. The average particle diameter of the aluminum-containing oxide powder of the present invention for a molded article is preferably not more than 100 microns. When the average particle diameter exceeds 100 microns, the resultant molded article shows a decrease in strength. The average particle diameter is preferably 0.1 to 30 microns.

As a method of producing a molded article from the aluminum-containing oxide powder of the present invention, a press molding method, a cast molding method, a doctor blade method, an extrusion molding method, an injection molding method, etc. can be used. The aluminum-containing oxide powder may be molded in the absence of a known binder, such as a resin, etc. However, such a binder may be incorporated as required.

The powder of the present invention can be press-molded by heating it at a low temperature even without using any binder. The heating temperature is preferably between 250° C. and 700° C., particularly preferably between 300° C. and 500° C. The pressure for the press molding is preferably not less than 100 MPa (megapascal), more preferably not less than 500 MPa. The so-obtained molded article has a high hardness and high electrical insulation properties. When the molded article is further heated at a high temperature of 700° C. or higher, there can be obtained an article of a crystalline aluminum-containing oxide which has a higher strength, a higher hardness, higher electrical insulation properties, etc.

The aluminum-containing oxide powder of the present invention can be molded at a low temperature without incorporating any binder. According to the present invention for producing the aluminum-containing oxide powder, a finely milled powder can be obtained by only oxidation without proceeding with any special milling step. The aluminum-containing oxide and the powder and molded article therefrom, provided by the present invention, are useful as or for a machine part, an electronic part and a raw material for a catalyst.

EXAMPLES

The present invention will be specifically explained hereinafter by reference to the Examples.

Example 1

17.6 Grams of a metallic aluminum powder (with a purity of not less than 99.9%, supplied by High Purity Chemicals Co., Ltd) and 0.48 g of metallic bismuth (with a purity of not less than 99.9%, supplied by High Purity Chemicals Co., Ltd) are fused and mixed in an arc furnace, filled into a silica tube having a nozzle (nozzle diameter 5 mm$\phi$), and melted by high-frequency induction heating. The melt was jetted to a metal roll (made of copper, diameter 200 mm, width 10 mm) rotating at 3,000 rpm and having an ordinary temperature in an argon atmosphere at a pressure difference of 0.2 kg/cm$^2$. The resultant ribbon-shaped thin fragments were allowed to stand in the atmosphere at an ordinary temperature to give a powder in 3 hours. The powder was observed with a scanning electron microscope and an average particle diameter of 15 microns was measured (FIG. 1).

The contents (Al, Bi and O) of the aluminum-containing oxide of the present invention were determined with an ICP and a thermobalance. At first, the aluminum-containing oxide was weighed before a powder was formed. A predetermined amount of the oxide was dissolved in concentrated hydrochloric acid, and the resultant solution was analyzed with an ICP (high-frequency, inductively coupled plasma emission analyzer) to determine the compositional ratio of Al and Bi. Furthermore, a powder obtained by allowing the aluminum-containing oxide to stand in an oxygen-containing gas (e.g., air) was dried under vacuum at 300° C. for 1 hour to fully remove water, and a predetermined amount of the powder was dissolved in a solvent. The resultant solution was measured with an ICP, and the amount of oxygen was calculated from the balance of Al and Bi.

Figure 2:
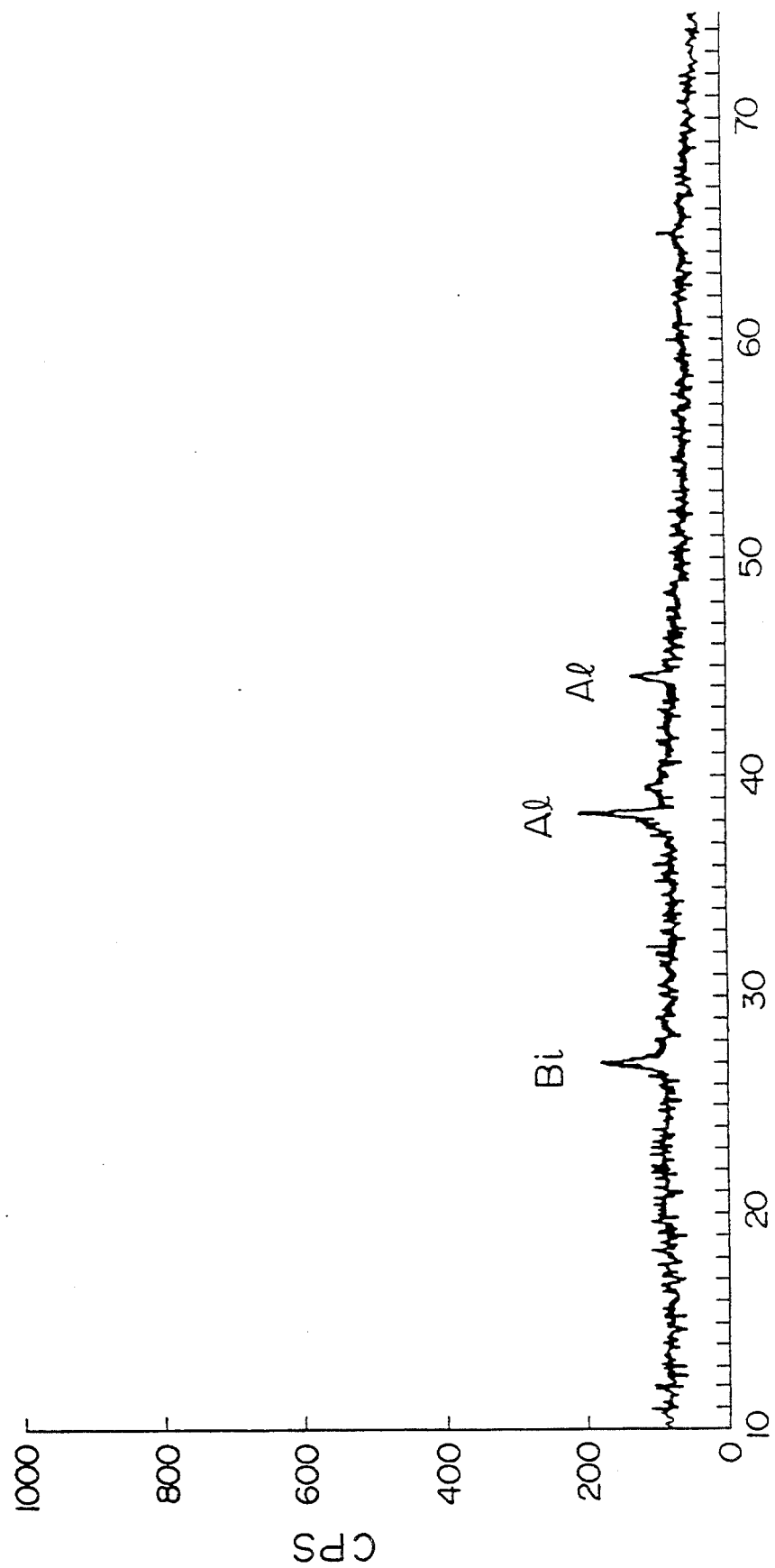
FIG. 2 is an X-ray diffraction chart showing existing states of bismuth metal and aluminum metal contained in the above oxide powder.

The above-obtained powder had a compositional ratio of $Al_{0.9965}Bi_{0.0036}O_{1.41}$ (atomic ratio). Although the measurement of the powder by X-ray diffractometry showed the presence of trace amounts of crystals of metallic bismuth (0.0001) and metallic aluminum (0.0589), the powder was amorphous as a whole (FIG. 2). Example 2

17.6 Grams of a metallic aluminum powder and 0.41 g of a metallic bismuth powder were mixed, and rapidly cooled and coagulated in the same manner as in Example 1. The resultant ribbon-shaped coagulation product was allowed to stand in the atmosphere for 2 hours to form a powder. The powder had an average particle diameter of 17 microns. The powder was measured for a specific surface area by a BET method using nitrogen. The powder measured 16 m$^2$g. Although the X-ray diffraction showed the presence of small amounts of crystals of metallic bismuth 0.0001 and metallic aluminum 0,033, the powder was amorphous as a whole. The powder had a composition, determined by ICP, of $Al_{0.997}Bi_{0.0030}O_{1.45}$ (atomic ratio).

Example 3

0.27 g of a metallic bismuth powder were mixed, and rapidly cooled and coagulated in the same manner as in Example 1. The resultant ribbon-shaped coagulation product was allowed to stand in the atmosphere overnight to form a powder. The powder had an average particle diameter of 20 microns and a composition of $Al_{0.998}Bi_{0.002}O_{1.4}$ (atomic ratio). Although the X-ray diffraction showed the presence of small amounts of crystals of metallic bismuth 0.0001 and metallic aluminum 0.066, the powder was amorphous as a whole.

Example 4

11 Grams of a metallic aluminum powder and 0.085 g of a metallic bismuth powder were mixed, and rapidly cooled and coagulated in the same manner as in Example 1. The resultant ribbon-shaped coagulation product was allowed to stand overnight in the atmosphere at 100° C. to give a powder. The powder had an average particle diameter of 30 microns and a composition of $Al_{0.999}Bi_{0.001}O_{1.49}$.

Example 5

11 Grams of a metallic aluminum powder and 0.425 g of a metallic bismuth powder were mixed, and rapidly cooled and coagulated in the same manner as in Example 1. The resultant ribbon-shaped coagulation product was allowed to stand in the atmosphere to form a powder. The powder had an average particle diameter of 10 microns and a composition of $Al_{0.995}Bi_{0.005}O_{1.49}$ (atomic ratio). Although the X-ray diffraction showed the presence of a small amount of a crystal of metallic bismuth (0.0066), the powder was amorphous as a whole.

Example 6

11 Grams of a metallic aluminum powder and 0.85 g of metallic bismuth were mixed, and rapidly cooled and coagulated in the same manner as in Example 1. The resultant ribbon-shaped coagulation product was allowed to stand in the atmosphere to form a powder. The powder had an average particle diameter of 10 microns and a composition of $Al_{0.99}Bi_{0.01}O_{1.49}$ (atomic ratio). Although the X-ray diffraction showed the presence of a small amount of a crystal of metallic bismuth (0.0066), the powder was amorphous as a whole.

Example 7

11 Grams of a metallic aluminum powder and 0.2 g of a metallic bismuth powder were mixed, and rapidly cooled and coagulated in the same manner as in Example 1. The resultant ribbon-shaped coagulation product was allowed to stand in the atmosphere to form a powder. The powder had an average particle diameter of 10 microns and a composition of $Al_{0.9977}Bi_{0.0023}O_{1.49}$.

Example 8

17.6 Grams of a metallic aluminum powder and 4.94 g of a metallic bismuth powder were mixed, and rapidly cooled and coagulated in the same manner as in Example 1. The resultant ribbon-shaped coagulation product was allowed to stand in the atmosphere for 3 hours to form a powder. The powder had an average particle diameter of 8 microns and a composition of $Al_{0.965}Bi_{0.035}O_{1.48}$ (atomic ratio). Although the X-ray diffraction showed the presence of a small amount of a crystal of metallic bismuth (0.0133), the powder was amorphous as a whole.

Example 9

17.6 Grams of a metallic aluminum powder and 0.1 g of a metallic bismuth powder were mixed, and rapidly cooled and coagulated in the same manner as in Example 12. When the resultant ribbon-shaped coagulation product was allowed to stand in the atmosphere overnight, the ribbon-shaped fragments were partially formed into a powder. The ribbon-shaped portion and the powder portion were mixed, and the mixture was measured. The measured composition was $Al_{0.9993}Bi_{0.0007}O_{1.35}$.

Example 10

An aluminum-containing oxide powder prepared in the same manner as in Example 1 was dried under vacuum and charged into a die having a cavity having a diameter of 5 mm and a length of 50 mm (maraging steel), and the powder was vacuumed ($2 \times 10^{-3}$ torr) at room temperature for 30 minutes. Thereafter, the temperature in the die was increased up to 380° C. over 30 minutes, and the pressure of 900 megapascal was applied for 10 minutes. The temperature was decreased to room temperature with vacuuming, and the resultant molded article was taken out. The molded article was a disk having a diameter of 5 mm and a thickness of 1.5 mm. The disk had a Vickers hardness, measured under a load of 100 g, of 318 kgf/mm$^2$. The electric resistance thereof, measured according to JIS K6911-1979 5.13, was $1.1 \times 10^{12}$ Ω.cm. The thermal conductivity thereof was 0.25 cal/cm.s.° C.

Example 11

11 Grams of a metallic aluminum powder and 8.55 g of a metallic bismuth powder were mixed, and rapidly cooled and coagulated in the same manner as in Example 1. The resultant ribbon-shaped coagulation product was allowed to stand in the atmosphere to form a powder. The powder had an average particle diameter of 10 microns and a composition of $Al_{0.9}Bi_{0.1}O_{1.48}$ (atomic ratio). Although the X-ray diffraction showed the presence of a small amount of a crystal of metallic bismuth (0.0133), the powder was amorphous as a whole.

The powder was molded with the same device as that described in Example 10 under the same conditions as those in Example 1. The molded article had a hardness of 340 kgf/mm$^2$. The electric resistance thereof was $5.6 \times 10^{10}$ Ω.cm.

Example 12

The powders obtained in Examples 2 to 9 were molded with the same shaping device as that described in Example 10 at a temperature of 250° to 400° C. under a pressure of 500 to 1,000 megapascal. Before use, however, the ribbon-shaped coagulation product obtained in Example 9 was milled with a ball mill until it had an average particle diameter of 10 microns. All of the resultant molded articles had a hardness of 300 kgf/mm$^2$ or higher.

Example 13

220 Grams of metal aluminum and 6 g of metallic bismuth were mixed, and the mixture was charged into a silica crucible (having a nozzle) and melted up to 1,100° C. by high-frequency induction heating in a nitrogen atmosphere. The resultant melt was jetted through the nozzle under a nitrogen atmosphere for 10 seconds. At the same time, nitrogen contained in a cylinder (cylinder pressure 150 atmospheres pressure) was jetted through a peripheral nozzle at 1.7 NTPm$^3$ against the melt being jetted. The resultant powder was observed with a scanning electron microscope to show the form of spheres (average particle diameter 35 microns). When the powder was allowed to stand in the atmosphere for one day at 100° C., there was obtained a fine powder having an average particle diameter of 10 microns. This fine powder was subjected to X-ray diffractometry to show the presence of small amounts of crystals of metallic bismuth (0,002) and metallic aluminum (0.018). However, the fine powder was amorphous as a whole. The fine powder had a composition of $Al_{0.9965}Bi_{0.0035}O_{1.47}$ (atomic ratio).

Example 14

The molded article obtained in Example 8 was calcined at a temperature of 1,000° C. in the atmosphere, and the calcined article was measured for a Vickers hardness and an electric resistance according to the methods described in Example 8. The hardness and resistance were 900 kgf/mm$^2$ and $1.5 \times 10^{14}$ Ω.cm, respectively.

Example 15

Aluminum oxides of $Al_{0.994}Bi_{0.005}M1_{0.001}O_y$ were prepared in the same manner as in Example 1. Si, B, Sn and Mn were used as $M_1$. The ribbon-shaped coagulation products obtained were allowed to stand in the atmosphere for one day to form powders. The value of Y measured from 1.45 to 1.48. These powders were molded with the same shaping device as that described in Example 10 under the same conditions as those in Example 10. All of the resultant molded articles were rigid articles having a hardness of 300 kgf/mm$^2$ or higher.

Example 16

Aluminum oxides of $Al_{0.993}Bi_{0.004}Si_{0.001}M2_{0.001}$ were jetted in the same manner as in Example 1. Fe, Ni and Pb were used as $M_2$. The resultant ribbon-shaped coagulation products were allowed to stand in the atmosphere for one day to form a powder. The powders obtained had a composition of $Al_{0.994}Bi_{0.004}Si_{0.001}M2_{0.001}O_z$ in which z was 1.44 to 1.49. These powders were molded with the same shaping device as that described in Example 10 under the same conditions as those in Example 10. All of the resultant molded articles were rigid articles having a hardness of 300 kgf/mm$^2$ or higher.

COMPARATIVE EXAMPLES

Comparative Example 1

A commercially available aluminum oxide powder (α-alumina having a diameter of 2 to 3 microns, γ-alumina having a diameter of 2 to 3 microns, with a purity of 99.9% or higher) was molded with a shaping device shown in Example 8 at a temperature of 400° C. under a pressure of 1,000 megapascal. The molded article taken out of the die was easily disintegrable and could not be measured for a Vickers hardness. The powder was therefore substantially unmoldable.

Comparative Example 2

Metallic aluminum without metallic bismuth was rapidly cooled and coagulated in the same manner as in Example 1 to give ribbon-shaped thin fragments. These fragments were allowed to stand in the atmosphere at an ordinary temperature for one day. However, no formation of a powder took place. The result of the X-ray diffraction thereof showed that these were in the state of metallic aluminum.

Even when this sample was heated in the atmosphere at 500° C. for 3 hours, no formation of a powder took place. X-ray diffraction results showed that the oxidation of the metallic aluminum hardly took place.

Comparative Example 3

A melt of $Al_{1-x}M_x$ (in which M was at least any of Mo, Si, Pb, Zn, Sn and Mn) and in which x was 0.005 (atomic ratio) was rapidly cooled and coagulated in the same manner as in Example 1 to give ribbon-shaped thin fragments. These fragments were allowed to stand in the atmosphere at an ordinary temperature for one day. However, no formation of a powder took place. X-ray diffraction results thereof showed that these were in the state of metallic aluminum, and the formation of a powder hardly took place.

As is clear from the above, the phenomenon that aluminum is oxidized at a low temperature to form a powder is a specific one which takes place only when bismuth has been incorporated.

INDUSTRIAL UTILITY

The aluminum-containing powder of the present invention can be molded at a low temperature, and is characterized in that said powder can be obtained by simple oxidation without proceeding with a special milling step. The aluminum-containing oxide and the powder and article therefrom are useful as or for a machine part, an electronic part and a raw material for a catalyst, etc.

We claim:

1. A process for producing an amorphous, aluminum-containing oxide having the composition $Al_{1-x-y1-y2}Bi_xM1_{y1}M2_{y2}O_z$, or a powder of said oxide having an average particle diameter of 0.1 to 100 microns, or an aluminum-containing metal composition containing an amorphous oxide having the composition $Al_{1-y-y1-y2}Bi_xM1_{y1}M2_{y2}O_z$, or a powder of said metal average particle diameter of 0.1 to 100 microns, which comprises the steps of forming a melt having a composition of $Al_{1-x-y1-y2}Bi_xM1_{y1}M2_{y2}$ (wherein x is defined by $0.0001 \leq x \leq 0.10$; $M_1$ is at least one selected from Si, P, B, Sb, Se, Te, Sn, Zn, In, Cr, Nb, Sc, Y, Sr, Ba, Ca, Na, Li, Mg, Mn, W, Ti, Zr, Hf, Be and rare earth metals; $M_2$ is at least one selected from Fe, Ni, Co, Rh, Ru, Re, Cu and Pb; Y1 is defined by $0 \leq y1 \leq 0.1$; y2 is defined by $0 \leq y2 \leq 0.01$, and x, y1, y2 and z are each an atomic ratio), rapidly cooling said melt to coagulate the melt, oxidizing the resulting coagulation product and recovering said amorphous, aluminum-containing oxide or said aluminum-containing metal composition from said coagulation product.

2. A crystalline product of an aluminum-containing oxide obtained by the steps comprising subjecting an aluminum-containing oxide having the composition $Al_{1-x-y1-y2}Bi_xM1_{x1}M2_{y2}O_x$, or a powder of said oxide having an average particle diameter of 0.1 to 100 microns, or an aluminum-containing metal composition containing an amorphous oxide having the composition $Al_{1-y-y1-y2}Bi_xM1_{x1}M2_{y2}O_x$, or a powder of said metal composition having an average particle diameter of 0.1 to 100 microns, (wherein x is defined by $0.0001 \leq x \leq 0.10$; $M_1$ is at least one selected from Si, P, B, Sb, Se, Te, Sn, Zn, In, Cr, Nb, Sc, Y, Sr, Ba, Ca, Na, Li, Mg, Mn, W, Ti, Zr, Hf, Be and rare earth metals; $M_2$ is at least one selected from Fe, Ni, Co, Rh, Ru, Re, Cu and Pb; Y1 is defined by $0 \leq y1 \leq 0.1$; y2 is defined by $0 \leq y2 \leq 0.01$, and x, y1, y2 and z are each an atomic ratio), to a heat treatment to convert said oxide or said metal composition to a crystalline form and recovering said resulting crystalline product.

* * * * *